(12) United States Patent
Hyde et al.

(10) Patent No.: US 9,987,592 B2
(45) Date of Patent: Jun. 5, 2018

(54) SYSTEMS AND METHODS FOR ABATING WASTE METHANE

(71) Applicant: Elwha LLC, Bellevue, WA (US)

(72) Inventors: Roderick A. Hyde, Redmond, WA (US); Jordin T. Kare, Seattle, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days. days.

(21) Appl. No.: 14/091,175

(22) Filed: Nov. 26, 2013

(65) Prior Publication Data

US 2015/0147255 A1    May 28, 2015

(51) Int. Cl.
| | |
|---|---|
| *F23G 5/50* | (2006.01) |
| *B01D 53/86* | (2006.01) |
| *F23C 13/08* | (2006.01) |
| *F23G 7/07* | (2006.01) |

(52) U.S. Cl.
CPC ....... *B01D 53/864* (2013.01); *B01D 53/8696* (2013.01); *F23C 13/08* (2013.01); *F23G 5/50* (2013.01); *F23G 7/07* (2013.01); *B01D 2257/7025* (2013.01); *Y02C 20/20* (2013.01)

(58) Field of Classification Search
CPC ....... Y02E 20/00; Y02E 20/344; Y02E 20/12; F23C 13/00; F23G 5/50; F23G 7/07; B01D 53/864; B01D 53/8696; B01D 2257/7025
USPC ............. 700/266, 271, 273, 274; 702/31, 32
See application file for complete search history.

(56) References Cited

U.S. PATENT DOCUMENTS

| | | |
|---|---|---|
| 5,820,260 A | 10/1998 | Vander Heyden et al. |
| 6,393,821 B1 | 5/2002 | Prabhu |
| 6,488,635 B1 | 12/2002 | Mottram |
| 7,343,341 B2 | 3/2008 | Sandor et al. |
| 7,457,758 B2 | 11/2008 | Zimmerman |
| 7,529,705 B1 | 5/2009 | Bartels et al. |
| 7,693,725 B2 | 4/2010 | Trout et al. |
| 7,983,929 B2 | 7/2011 | Zimmerman |

(Continued)

FOREIGN PATENT DOCUMENTS

GB    2469803 A    11/2010

OTHER PUBLICATIONS

Methane Capture: Options for Greenhouse Gas Emission Reduction, Bracmort etal., Jan. 7, 2001.*

(Continued)

*Primary Examiner* — Shogo Sasaki
(74) *Attorney, Agent, or Firm* — Foley & Lardner LLP

(57) ABSTRACT

A system for abating waste methane includes a catalytic combustor device configured to catalytically combust waste-associated methane emissions generated by waste in a waste container, where the catalytic combustion is based on a reaction of the methane emissions and a catalyst of the catalytic combustor device in the presence of heat. The system further includes a combustion sensor configured to generate combustion data based on the catalytic combustion, a transmitter, and a processing circuit. The processing circuit is configured to control operation of the catalytic combustor device, determine an amount of methane abated by the catalytic combustor device, where the amount of methane abated is based on the combustion data, and report, via the transmitter, the amount of methane abated by the catalytic combustor device.

17 Claims, 10 Drawing Sheets

(56) References Cited

U.S. PATENT DOCUMENTS

| | | |
|---|---|---|
| 2001/0014436 A1 | 8/2001 | Lemelson et al. |
| 2004/0088179 A1 | 5/2004 | Cogen et al. |
| 2004/0158478 A1 | 8/2004 | Zimmerman |
| 2005/0246190 A1 | 11/2005 | Sandor et al. |
| 2005/0273358 A1 | 12/2005 | Zimmerman |
| 2006/0184445 A1 | 8/2006 | Sandor et al. |
| 2007/0192221 A1 | 8/2007 | Sandor et al. |
| 2007/0203722 A1 | 8/2007 | Richards et al. |
| 2007/0233502 A1 | 10/2007 | Richards et al. |
| 2007/0250329 A1 | 10/2007 | Richards et al. |
| 2008/0015976 A1 | 1/2008 | Sandor et al. |
| 2008/0270272 A1 | 10/2008 | Branscomb |
| 2009/0043653 A1 | 2/2009 | Sandor et al. |
| 2009/0070252 A1 | 3/2009 | Bartels et al. |
| 2009/0287520 A1 | 11/2009 | Zimmerman |
| 2010/0275778 A1 | 11/2010 | Harttung |
| 2011/0055092 A1 | 3/2011 | Fargano et al. |
| 2011/0071721 A1 | 3/2011 | Gilfillan et al. |
| 2011/0132592 A1 | 6/2011 | Apple et al. |
| 2011/0209399 A1 | 9/2011 | Bohlig et al. |
| 2012/0028360 A1 | 2/2012 | Tordoff |
| 2012/0247086 A1 | 10/2012 | Gonze et al. |

OTHER PUBLICATIONS

Australian Government, IP Australia Patent Examination Report No. 1; App. No. 2011326765; dated Jul. 25, 2014 (rec'd by our agent Jul. 31, 2014); pp. 1-4.

Centi et al.; "Reduction of greenhouse gas emissions by catalytic processes"; Applied Catalysis B: Environmental; May 29, 2002; pp. 143-155; vol. 41; Elsevier Science B.V.

PCT International Search Report; International App. No. PCT/US2014/067114; dated Mar. 2, 2015; pp. 1-4.

Supplementary European Search Report; European App. No. EP 11 83 9124; dated Nov. 14, 2016 (received by our Agent on Nov. 16, 2016); pp. 1-6.

\* cited by examiner

SYSTEMS AND METHODS FOR ABATING WASTE METHANE

CROSS-REFERENCE TO RELATED APPLICATIONS

This application is related to U.S. application Ser. No. 12/927,315, now U.S. Pat. No. 8,673,219, titled "Nasal passage insertion device for treatment of ruminant exhalations," filed Nov. 10, 2010, which is incorporated herein by reference in its entirety.

BACKGROUND

Methane is the second most prevalent greenhouse gas emitted in the United States. In general, by weight, methane is also a more potent greenhouse gas than other greenhouse gases, such as carbon dioxide. Methane is generated through both natural and human activities, including sources such as fossil fuel extraction, wetlands emissions, leakage from natural gas systems, waste and landfill systems, and livestock waste. Due to human activities, methane concentrations have increased largely during the 20th century and are now more than double pre-industrial levels.

SUMMARY

One embodiment relates to a system for abating waste methane includes a catalytic combustor device configured to catalytically combust waste-associated methane emissions generated by waste in a waste container, where the catalytic combustion is based on a reaction of the methane emissions and a catalyst of the catalytic combustor device in the presence of heat. The system further includes a combustion sensor configured to generate combustion data based on the catalytic combustion, a transmitter, and a processing circuit. The processing circuit is configured to control operation of the catalytic combustor device, determine an amount of methane abated by the catalytic combustor device, where the amount of methane abated is based on the combustion data, and report, via the transmitter, the amount of methane abated by the catalytic combustor device.

Another embodiment relates to a method of abating waste methane. The method includes controlling, with a processing circuit, operation of a catalytic combustor device, and catalytically combusting, with the catalytic combustor device, waste-associated methane emissions, wherein the waste-associated methane emissions are generated by waste in a waste container, and wherein the catalytic combustion is based on a reaction of the methane emissions and a catalyst of the catalytic combustor device in the presence of heat. The method further includes generating, with a combustion sensor, combustion data based on the catalytic combustion by the catalytic combustor device. The method further includes determining an amount of methane abated by the catalytic combustor device, where the amount of methane abated is based on the combustion data, and reporting the amount of methane abated by the catalytic combustor device.

Another embodiment relates to a non-transitory computer-readable medium having instructions stored thereon, that when executed by a computing device cause the computing device to perform operations for abating waste methane. The operations include controlling operation of a catalytic combustor device, and catalytically combusting, by the catalytic combustor device, waste-associated methane emissions, where the waste-associated methane emissions are generated by waste in a waste container, and where the catalytic combustion is based on a reaction of the methane emissions and a catalyst of the catalytic combustor device in the presence of heat. The operations further include receiving, from a combustion sensor, combustion data based on the catalytic combustion by the catalytic combustor device. The operations further include determining an amount of methane abated by the catalytic combustor device, where the amount of methane abated is based on the combustion data, and reporting the amount of methane abated by the catalytic combustor device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
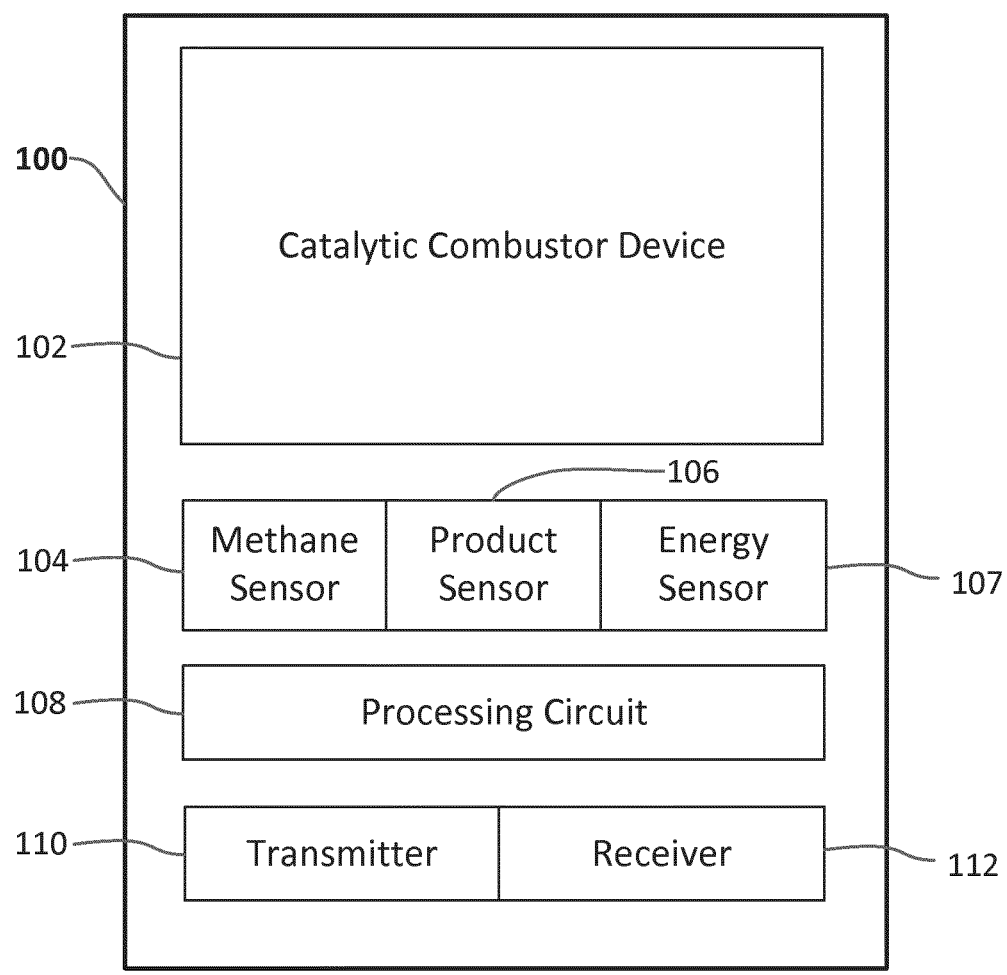
FIG. 1 is a block diagram of a system for abating waste methane according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments of systems and methods for abating waste methane are shown and described. Human waste generates substantial amounts of waste associated methane. For example, waste-associated methane may be released from sewer systems, septic tanks, toilets, etc. Because methane is a powerful greenhouse gas, facilities often burn excess methane rather than release the methane into the atmosphere. For example, an operator of a landfill often burns the methane emitted from the landfill. Although carbon dioxide is generated and released as a result of burning off the methane, the tradeoff of not receiving a costly methane release penalty from a governing body may make such a practice worthwhile for an operator. Typically, burning emitted methane in this manner is not viable as the scale of an operation gets smaller.

According to various embodiments, catalytic combustor device is utilized as an alternative to safely eliminate waste methane emissions from sewer systems, septic tanks, and toilets, via catalytic combustion. A processing circuit may be used to control operation of the catalytic combustor device and record data related to methane abated by the device. For example, the processing circuit may enable or disable the device, or may control a heating element of the catalytic combustor device such that a proper temperature is reached to allow a catalyst of the device to drive a desired oxidation reaction of the waste methane. The processing circuit may interface with various combustion related sensor devices (a methane sensor, an oxygen sensor, a carbon dioxide sensor, and energy sensor, etc.) to generate reporting data based on the catalytic combustion of the methane by the device. For example, the processing circuit may determine an amount of methane abated, a global warming abatement value, a carbon offset amount, an emission credit, etc. The processing circuit can store this data and transmit the report values (via a transmitter) to an external device. Various incentives may be offered (e.g., by the federal or local government, etc.) based on the reported methane abatement data in order to entice people to use a catalytic combustor device as described herein, and thereby reduce greenhouse gas emissions.

Referring to FIG. 1, a block diagram of system 100 for abating waste methane is shown. According to one embodiment, system 100 includes catalytic combustor device 102 configured to catalytically combust waste associated methane emissions passing therethrough. Catalytic combustor device 102 includes all components necessary to catalytically combust methane. For example, catalytic combustor device 102 may include a heating element configured to heat a combustion chamber. The heating element may be controllable by processing circuit 108. Catalytic combustor device 102 may further include a catalyst for the catalytic oxidation of methane to carbon dioxide and water. In one embodiment, the catalyst is a Palladium-based catalyst, although other low-temperature oxidation catalysts (e.g., platinum, gold, rare-earth elements, metal-oxides, or transition metals, etc.) may also be used. Catalytic combustor device 102 may further include a heat exchanger configured to transfer heat released from the catalytic combustion into the pre-combusted reactants (i.e., the methane-containing atmosphere) to pre-warm them prior to reaching the catalyst.

Catalytic combustor device 102 further includes sensor devices (methane sensor 104, product sensor 106, and/or energy sensor 107) configured to generate data related to the reagents and products related to the catalytic combustion of methane. For example, methane sensor 104 includes one or more components configured to detect the presence of methane gas in an atmosphere. Methane sensor 104 may also include components configured to detect other atmospheric constituents (e.g., oxygen, carbon dioxide, etc.). Methane sensor 104 may also be configured to directly provide data related to a flow rate of a gas (e.g., waste associated methane emissions) flowing into catalytic combustor device 102. Alternatively, processing circuit 108 may calculate a flow rate from methane data provided by methane sensor 104. Product sensor 106 includes components configured to detect various products of the catalytic combustion of methane. For example, product sensor 106 may include one or more sensor components configured to detect water vapor, carbon dioxide, carbon monoxide, oxygen, methane, etc. Product sensor 106 may also be configured to directly provide data related to a flow of a product exiting catalytic combustor device 102. Alternatively, processing circuit 108 may calculate a flow rate from product data provided by product sensor 106. Energy sensor 107 includes components configured to detect energy released by the catalytic combustion of methane. Alternatively, processing circuit 108 may calculate a flow rate from energy data provided by energy sensor 107. Methane sensor 104, product sensor 106, and/or energy sensor 107 may be integrated into catalytic combustor device 102 or may be separate sensor devices.

Processing circuit 108 is further included in system 100 and includes processing components configured to interface with the various components of system 100 and to control operation of catalytic combustor device 102. Processing circuit 108 may record data provided by methane sensor 104, product sensor 106, and/or energy sensor 107, and maintain metrics related to the data. Processing circuit 108 may generate various methane abatement values and report the data via transmitter 110. Transmitter 110 includes components necessary to transmit data (e.g., methane abatement amounts, product amounts, greenhouse gas credits, configuration data, etc.) as provided by processing circuit 108. For example, transmitter 110 may include a radiofrequency transmitter. As another example, transmitter 110 may include a transmitter configured to send data via a wired connection (e.g., a serial port, etc.). As another example, transmitter 110 may be configured to deliver data to a removable memory device (e.g., USB drive, SD card, etc.). Receiver 112 includes components necessary to receive control signals (program instructions, parameters, or data) for use by processing circuit 108. For example, receiver 112 may include a radiofrequency receiver. As another example, receiver 112 may include a receiver configured to receive signals via a wired connection (e.g., a serial port, etc.). As another example, receiver 112 may be configured to receive signals from an externally supplied memory device (e.g., USB drive, SD card, etc.).

Figure 2:
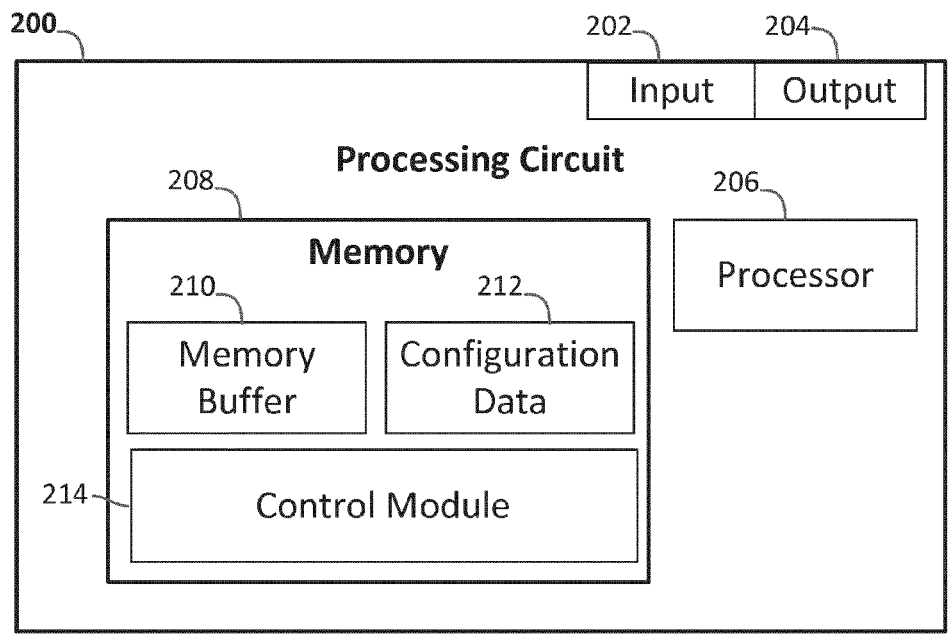
FIG. 2 is a block diagram of a processing circuit according to one embodiment.

Referring to FIG. 2, a block diagram of processing circuit 200 for completing the systems and methods of the present disclosure is shown according to one embodiment. Processing circuit 200 is generally configured to communicate with a sensor device and a catalytic combustor device. Processing circuit 200 is further configured to receive configuration data. Input data may be accepted continuously or periodically. Processing circuit 200 uses the input data to generate various metrics related to methane abatement as a result of catalytic combustion of the methane. Processing circuit 200 also generates the signals necessary to control operation of the combustor device (e.g., control a heating element, enable/disable the device, etc.). Processing circuit 200 also generates reporting data based on sensor data and formats the data to be transmitted. In controlling the combustor device and in generating reporting data, processing circuit 200 may make use of machine learning, artificial intelligence, interactions with databases and database table lookups, pattern recognition and logging, intelligent control, neural networks, fuzzy logic, etc. Processing circuit 200 further includes input 202 and output 204. Input 202 is configured to receive a data stream (e.g., a digital or analog stream of data) and configuration information. Output 204 is configured to output data for transmission (e.g., via a transmitter) or for use in a configuration process of a corresponding combustor device.

According to one embodiment, processing circuit 200 includes processor 206. Processor 206 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 200 also includes memory 208. Memory 208 includes one or more devices (e.g., RAM, ROM, Flash Memory, hard disk storage, etc.) for storing data and/or computer code for facilitating the various processes described herein. Memory 208 may be or include non-transient volatile memory or non-volatile memory. Memory 208 may include database components, object code components, script components, or any other type of information structure for supporting the various activities and information structures described herein. Memory 208 may be communicably connected to processor 206 and provide computer code or instructions to processor 206 for executing the processes described herein (e.g., the processes shown in FIGS. 5-10). Memory 208 includes memory buffer 210. Memory buffer 210 is configured to receive a data stream from a sensor device (e.g. methane sensor 104 or product sensor 106) through input 202. For example, the data may include a real-time stream of methane concentration or atmospheric component data. As another example, the data may include a stream of product data related to a product of an oxidation reaction of waste methane (e.g., carbon dioxide, etc.). The data received through input 202 may be stored in memory buffer 210 until memory buffer 210 is accessed for data by the various modules of memory 208. For example, control module 214 can access the data that is stored in memory buffer 210. Any data received through input 202 may also be immediately accessed.

Memory 208 further includes configuration data 212. Configuration data 212 includes data related to processing circuit 200. For example, configuration data 212 may include information related to interfacing with other components (e.g., sensors, a transmitter, a combustor device, etc.). This may also include the command set needed to interface with a computer system used configure a system having processing circuit 200. Based on data stored in configuration data 212, processing circuit 200 may format data for output via output 204, which may include formatting data for transmission via a transmitter, etc. For example, processing circuit 200 may format a report related to methane abatement into packets for transmission according to a networking protocol. Processing circuit 200 may also format data for transmission according to any additional protocols as specified by configuration data 212. Configuration data 212 may further include information as to how often input should be accepted from a sensor device. Configuration data 212 may include default values required to initiate communication with an external device (e.g., a remote computer, etc.) and with a sensor, a combustor, a transmitter, and any components of the system having processing circuit 200. Configuration data 212 further includes data to configure communication between the various components of processing circuit 200.

Memory 208 further includes control module 214. Control module 214 is configured to receive sensor data from a sensor device (e.g., methane sensor 104, product sensor 106, etc.), configuration information, and other data as provided by processing circuit 200. Control module 214 generates signals to cause a combustor (e.g., catalytic combustor device 102) to catalytically combust waste methane. Control module 214 monitors data provided by the sensor devices to record values related to the oxidation of the methane during catalytic combustion. Control module 214 generates reports and metrics, formats data for transmission, and causes data to be transmitted via a transmitter.

In one embodiment, a catalytic combustion device (e.g., system 100) including processing circuit 200 is configured to be mounted above a waste container. For example, the waste container can be a septic tank, a sewer, or a toilet, etc. The device may be mounted near or directly above an exhaust of the waste container and is configured to catalytically combust methane emissions in the atmosphere above/near of the waste container. In another embodiment, the device is coupled to the exhaust of the waste container. For example, the exhaust of the waste container may include an exhaust fan/ventilation system, or a vent tube that is connected directly to the device. Alternatively, the device may be integrated into exhaust systems of the waste container. In another embodiment, the device is configured to be enclosed in the atmosphere of the waste container (e.g., mounted within a septic tank or sewer, etc.). Control module 214 controls the operation of the catalytic combustion device. For example, control module may enable/initiate combustion when control module 214 detects a certain concentration of methane. In one embodiment, control module 214 enables combustion when any methane is detected to be flowing into the device, and combustion may continue until methane is no longer flowing (or is no longer of a concentration such that the oxidation reaction of catalytic combustion occurs). Control module 214 may also enable and disable the catalytic combustion device based on data from a methane sensor or a product sensor of the device. In another embodiment, control module 214 enables/disables combustion according to a schedule (and an availability of methane to catalytically combust). For example, control module 214 may enable the device for a certain time period per day as specified by configuration data 212, and the device may catalytically combust methane as long as methane emissions are present when the device is enabled. The schedule of operation may be also provided and customized by data received through a receiver of the device (e.g., receiver 112).

In one embodiment, control module 214 is configured to record data related to catalytic combustion of the waste methane by the device. The recorded data is based on data provided by the sensors (e.g., methane sensor 104, product sensor 106, and energy sensor 107) of the device. Control module 214 may determine various metrics based on the recorded data. In one embodiment, control module 214 determines the amount of methane removed (i.e. abated) as a result of catalytic combustion of the methane by the device. The amount of methane removed may be calculated by control module 214 in a variety of ways. For example, control module 214 may determine a methane concentration before catalytic combustion occurs, and compare that value to a concentration of methane after catalytic combustion has occurred for a certain period of time. Based on the concentration difference, control module 214 can calculate the amount of methane abated. As another example, control module 214 may determine an amount of energy released during operation by analyzing energy data from energy sensor 107 (i.e. heat generated) and calculating the amount of methane abated based on the energy released during catalytic combustion. As another example, control module 214 may determine an amount and type of a product of the oxidation reaction of waste methane during catalytic combustion. Control module 214 may then calculate the amount of methane abated by analyzing the amount and type of products produced during catalytic combustion. Control module 214 may calculate a relative amount of methane abatement by comparing the amount of methane abated to the amount of methane detected by methane sensor 104. Control module 214 may store any of the data described herein to maintain a history of the device's operation.

In one embodiment, control module 214 generates reports based on the data recorded by control module 214. Control module 214 may transmit the reports with a transmitter (e.g., transmitter 110) of the device. For example, upon completion of combustion, control module 214 may transmit a report including the amount of methane abated during the most operating cycle. As another example, control module 214 may transmit a report according to a schedule (e.g., a daily, weekly, or monthly report may be transmitted). As another example, control module 214 may transmit a report according to an amount of methane abated (e.g., for each 10 kg of abated methane). As another example, control module 214 may transmit a report on demand or in response to a report request received via the transmitter. Such reports may also include a running total amount of methane abated by the device. Such reports may also include specific details or totals relating to the catalytic combustion process. For example, a report may include a type and amount of a product of the oxidation reaction of the waste methane. A report may include a running time of combustion and an efficiency value related to the catalyst of the device. In one embodiment, a report includes an amount of carbon dioxide produced during a period of catalytic combustion. In another embodiment, a report includes an amount of oxygen during a period of catalytic combustion. In another embodiment, a report includes an amount of water produced during a period of catalytic combustion. In another embodiment, a report includes an amount of carbon monoxide produce during a period of catalytic combustion. The amounts and types of products may also depend on a type of catalyst in use by the device.

In one embodiment, control module 214 determines analytical values based on catalytic combustion of waste methane emissions by the device. The values may be included in any reports generated and transmitted by control module 214. In one embodiment, control module 214 determines a global warming abatement amount, including a measure of how much the device has contributed to abatement of methane in general. The global warming abatement amount can include a net abatement amount, incorporating both the effects of greenhouse gases (e.g., carbon monoxide, carbon dioxide, water vapor) added by the combustion as well as the effects of those removed (e.g., methane). These contributions can include both the amounts of the products, their warming effects, their atmospheric residence times, etc. The global warming abatement amount may be with respect to global, national, or local abatement/methane emission levels. In another embodiment, control module 214 determines a greenhouse gas emission value based on the type and amount of a product of the catalytic combustion of the methane, and the amount of methane removed. In another embodiment, control module 214 calculates an emission credit based on an amount of methane abated by the device. This may be based on federal, state, or local governmental guidelines, or may be based on an abatement incentive program. In another embodiment, control module 214 determines a carbon offset based on operation of the device. Alternatively, a third party (e.g., a governing body) may use the data recorded and reported by control module 214 to calculate any of the metrics and values discussed herein.

In one embodiment, control module 214 controls operation of the device based on an amount of methane removed by the device. For example, a target abatement amount may be established (e.g., transmitted to the device, stored in configuration data 212, etc.) and control module 214 may allow the device to operate (e.g., catalytically combust methane) while the device's abatement amount is less than the target abatement amount. Upon reaching the target, control module 214 may disable the device until a new target is received or a different operating mode is selected. An abatement target amount may include an amount of methane to be abated per day, week, and/or month, etc. An abatement target may also include a schedule of target amounts, with varying target amounts as specified by the schedule. In one embodiment, control module 214 changes an operational mode of the device based on the abatement target. For example, control module 214 may allow the device to operate at a maximum combustion rate prior to reaching a target, and may cause the device to operate a reduced rate after the abatement target has been reached. Control module 214 may adjust a combustion rate by altering the flow of methane into the device (e.g., via an electronically controlled valve, etc.) or by altering the temperature of the catalyst (e.g., via controlling a heat element as discussed above). In another embodiment, control module 214 controls the operation of the device based on a price of an emission credit related to methane abatement. For example, a government or organization may offer various incentives if certain levels of methane are abated. The device may receive these emission credit prices via the receiver, and control module 214 may enable/disable/change operational modes of the device and control operation of the device in response to credit prices or incentives for such abatement.

Figure 3A:
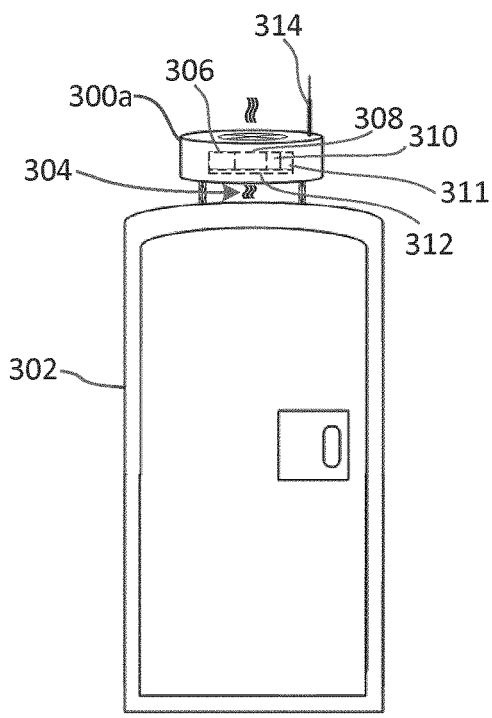
FIG. 3a is a schematic diagram of a system for abating waste methane according to one embodiment.

Referring to FIG. 3a, a schematic diagram of system 300a for abating waste methane is shown according to one embodiment. System 300a may be configured as system 100, and includes methane sensor 306, catalytic combustor 308, product sensor 310, energy sensor 311, processing circuit 312, and radio transmitter 314. System 300a is depicted as being configured to catalytically combust waste associated methane in atmosphere 304 above waste container 302. Although waste container 302 is depicted as a portable toilet, waste container 302 may be any type of waste container. As methane emissions in atmosphere 304 flow into catalytic combustor 308 of system 300a, they are catalytically combusted to oxidize and abate the methane emissions. Processing circuit 312 controls the operation of catalytic combustor 408, including enabling and disabling catalytic combustor 308 and setting various operational modes. Sensors 306, 310, and 311 provide data related to the oxidation of the methane emissions from waster container 302. This data is used by processing circuit 312 to determine the values and metrics described herein. Processing circuit 312 uses transmitter 314 to report the determined values and metrics (e.g., an amount of methane abated by system 300a, etc.).

Figure 3B:
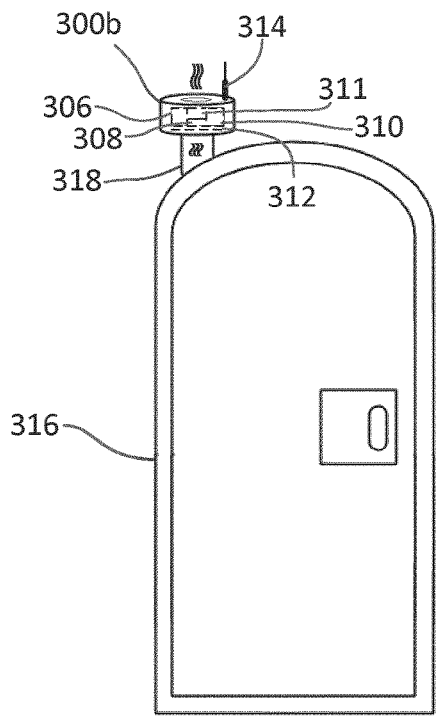
FIG. 3b is a schematic diagram of a system for abating waste methane according to one embodiment.

Referring to FIG. 3b, a schematic diagram of system 300b for abating waste methane is shown according to one embodiment. System 300b may be configured as system 100, and includes methane sensor 306, catalytic combustor 308, product sensor 310, processing circuit 312, and radio transmitter 314. System 300b is depicted as being coupled directly to vent tube 318 of waste container 316. System 300b is configured to catalytically combust waste associated methane of waste container 316 that is flowing through vent tube 318. Although waste container 316 is depicted as a portable toilet, waste container 316 may be any type of waste container and other ventilation system configurations are envisioned. As methane emissions in vent tube 318 flows into catalytic combustor 308, they are catalytically combusted to oxidize and abate the methane emissions. Sensors 306, 310, and 311 provide data related to the oxidation of the methane emissions that is used by processing circuit 312 to determine the values and metrics described herein. Processing circuit 312 uses transmitter 314 to report the values and metrics (e.g., an amount and type of a product produced during catalytic combustion of methane abated by system 300b, etc.).

Figure 4:
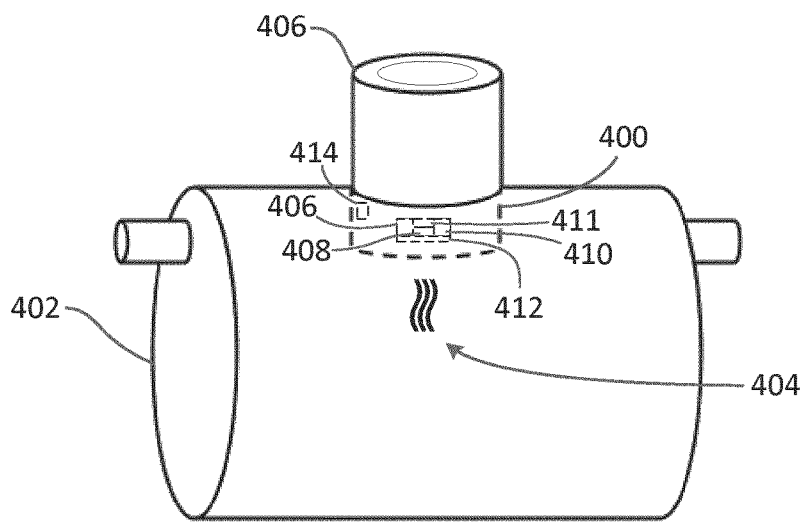
FIG. 4 is a schematic diagram of a system for abating waste methane according to one embodiment.

Referring to FIG. 4, a schematic diagram of system 400 for abating waste methane is shown according to one embodiment. System 400 may be configured as system 100, and includes methane sensor 406, catalytic combustor 408, product sensor 410, energy sensor 411, processing circuit 412, and internal transmitter 414. System 400 is configured to catalytically combust waste associated methane of waste container 402 that is in internal atmosphere 404 of waste container 402. Although waste container 402 is depicted as a septic tank, waste container 402 may be any type of waste container. As methane emissions in internal atmosphere 404 flow into catalytic combustor 408, they are catalytically combusted to oxidize and abate the methane emissions. The products of the catalytic combustion may then be vented via the typical exhaust/venting mechanisms of the septic tank. Sensors 406, 410, and 411 provide data related to the oxidation of the methane emissions to processing circuit 412 to determine the values and metrics described herein. Processing circuit 412 uses internal transmitter 414 to report the values and metrics (e.g., a carbon offset, a global warming abatement amount, an emissions credit, etc.).

Figure 5:
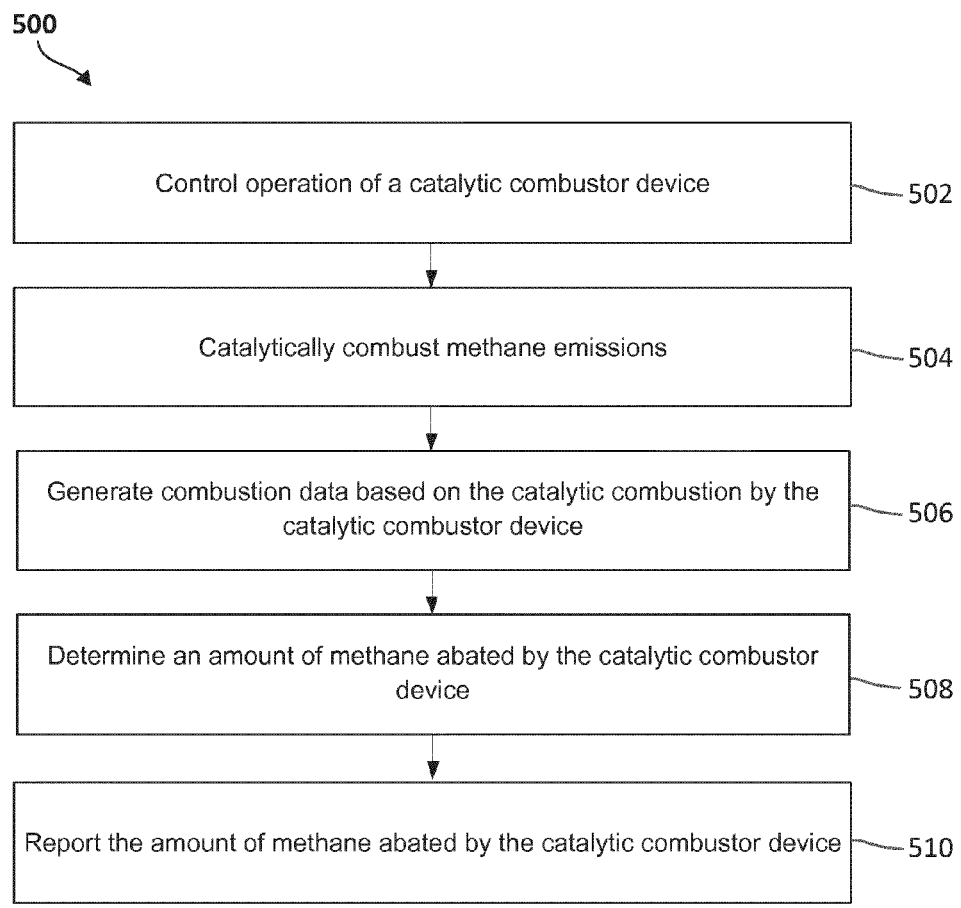
FIG. 5 is a flowchart of a process for abating waste methane according to one embodiment.

Referring to FIG. 5, a flow diagram of a process 500 for abating waste methane is shown, according to one embodiment. In alternative embodiments, fewer, additional, and/or different actions may be performed. Also, the use of a flow diagram is not meant to be limiting with respect to the order of actions performed. The operation of a catalytic combustor device is controlled (e.g., enabled, disabled, run according to a schedule, etc.) (502). Methane emissions are catalytically combusted by a catalytic combustor device (504). For example, in the presence of heat, a catalyst of the catalytic combustor oxidizes the methane emissions. The methane emissions are generally waste-associated emissions. For example, the methane emissions may emanate from the contents of a septic tank, a sewer, a toilet, or other waste containers. Combustion data is generated based on the catalytic combustion by the catalytic combustor device (506). For example, various sensors (e.g., a product sensor, a methane sensor, an energy sensor, etc.) may be used to generate data as described herein. Based on the combustion data, an amount of methane abated by the catalytic combustor device is determined (508). The amount of methane abated by the catalytic combustor device is reported (510). For example, reporting data may be transmitted wirelessly to a receiving device, or may be transmitted via a communication cable that is connected to the catalytic combustor device.

Figure 6:
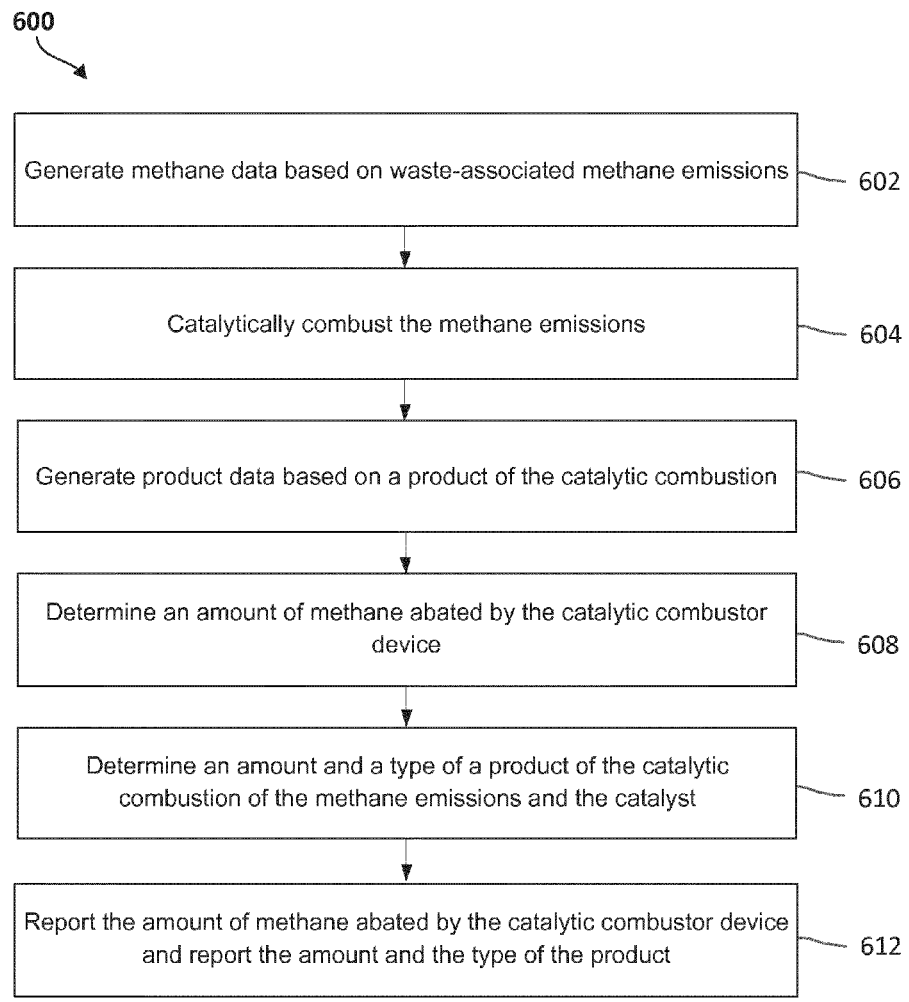
FIG. 6 is a flowchart of a process for abating waste methane according to one embodiment.

Referring to FIG. 6, a flow diagram of a process 600 for abating waste methane is shown, according to one embodiment. In alternative embodiments, fewer, additional, and/or different actions may be performed. Also, the use of a flow diagram is not meant to be limiting with respect to the order of actions performed. Methane data is generated based on waste-associated methane emissions entering a catalytic combustor device or within the atmosphere around the combustor device (602). For example, a methane sensor may be utilized to measure the amount of methane emissions flowing into the catalytic combustor. As another example, a methane sensor may measure the amount of methane in the localized atmosphere near the catalytic combustor. The methane emissions are generally waste-associated emissions. The methane emissions may emanate from the contents of a septic tank, a sewer, a toilet, or other waste containers. The methane emissions are then catalytically combusted by the catalytic combustor device (604). For example, in the presence of heat, a catalyst of the catalytic combustor oxidizes the methane emissions. Product data is generated based on a product of the catalytic combustion (606). A product sensor (including one or more sensor devices) may be used to detect the products of the catalytic combustion of the waste methane. For example, the product sensor may include carbon dioxide, water vapor, carbon monoxide, and heat sensing components. Based on the data related to the methane amount and the product data, an amount of methane abated by the catalytic combustor device is determined (608). Further, an amount and type of a product of the catalytic combustion is also determined using the product data (610). The amount of methane abated by the catalytic combustor device is reported, and the amount and the type of the product is also reported (612). For example, reporting data may be transmitted wirelessly to a receiving device, or may be transmitted via a communication cable that is connected to the catalytic combustor device.

Figure 7:
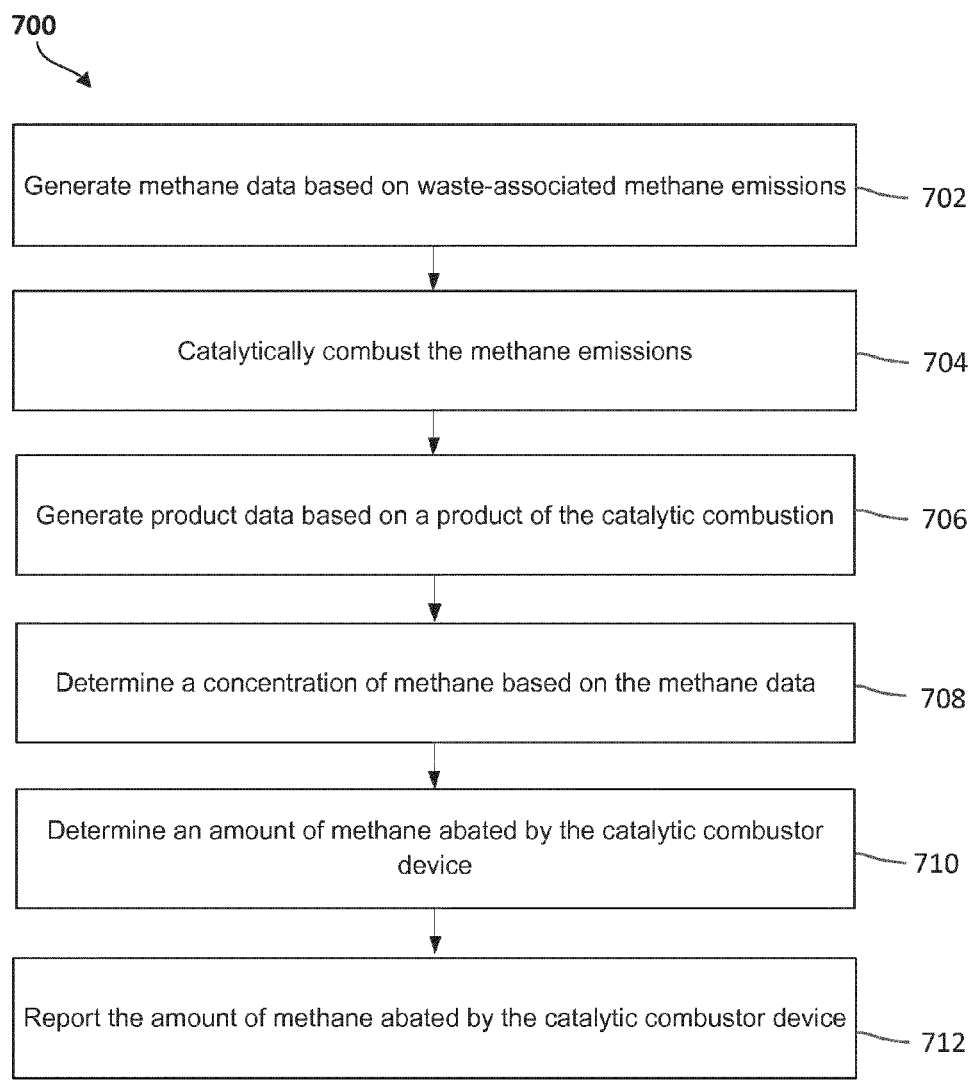
FIG. 7 is a flowchart of a process for abating waste methane according to one embodiment.

Referring to FIG. 7, a flow diagram of a process 700 for abating waste methane is shown, according to one embodiment. In alternative embodiments, fewer, additional, and/or different actions may be performed. Also, the use of a flow diagram is not meant to be limiting with respect to the order of actions performed. Methane data is generated based on waste-associated methane emissions entering a catalytic combustor device or within the atmosphere around the combustor device (702). The methane emissions are catalytically combusted by a catalytic combustor device (704). Product data is generated based on a product of the catalytic combustion (706). A concentration of methane in the methane emissions is determined based on the methane data (708). The concentration is determined both before and after a period of combustion, and an amount of methane abated by combustion is determined based on the difference in concentrations (710) from before and after combustion. The amount of methane abated by the catalytic combustor device is then reported (712). For example, the amount of methane may be transmitted to a laptop computer or a mobile device.

Figure 8:
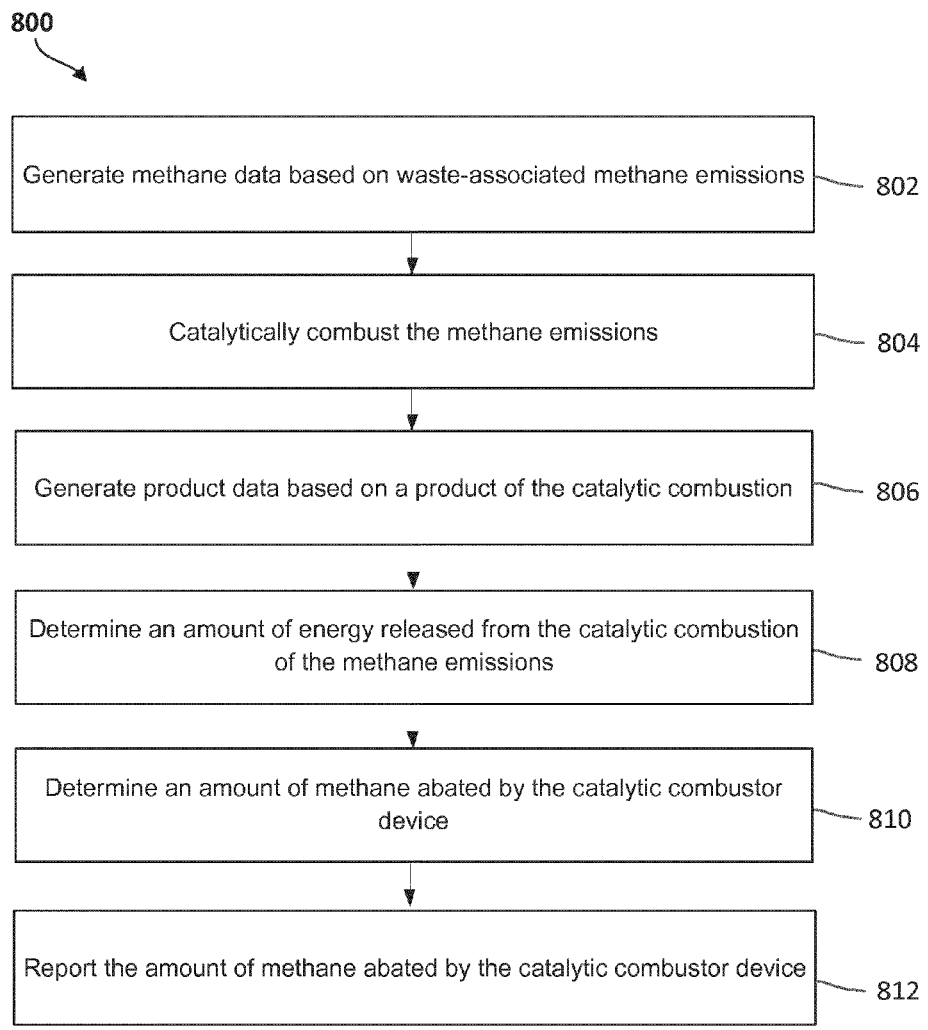
FIG. 8 is a flowchart of a process for abating waste methane according to one embodiment.

Referring to FIG. 8, a flow diagram of a process 800 for abating waste methane is shown, according to one embodiment. In alternative embodiments, fewer, additional, and/or different actions may be performed. Also, the use of a flow diagram is not meant to be limiting with respect to the order of actions performed. Methane data is generated based on waste-associated methane emissions entering a catalytic combustor device or within the atmosphere around the combustor device (802). The methane emissions are catalytically combusted by a catalytic combustor device (804). Product data is generated based on a product of the catalytic combustion of the methane (806). For example, an amount of heat given off by during oxidation of the methane emissions may be recorded, or a concentration of a product may be determined Based on the product data and the methane data, an amount of energy released from the catalytic combustion of the methane emissions is determined (808). An amount of methane abated by combustion is determined based on the energy released during the catalytic combustion (810). The amount of methane abated by the catalytic combustor device is reported (812).

Figure 9:
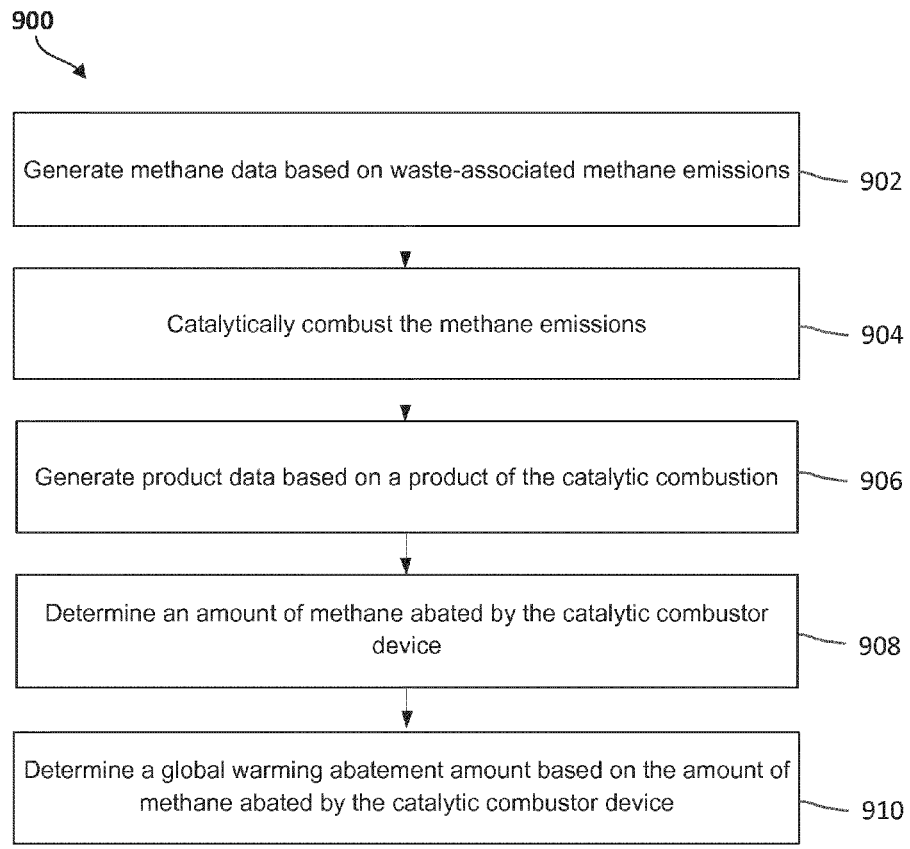
FIG. 9 is a flowchart of a process for abating waste methane according to one embodiment.

Referring to FIG. 9, a flow diagram of a process 900 for abating waste methane is shown, according to one embodiment. In alternative embodiments, fewer, additional, and/or different actions may be performed. Also, the use of a flow diagram is not meant to be limiting with respect to the order of actions performed. Methane data is generated based on waste-associated methane emissions entering a catalytic combustor device or within the atmosphere around the combustor device (902). The methane emissions are catalytically combusted by a catalytic combustor device (904). Product data is generated based on a product of the catalytic combustion (906). An amount of methane abated by combustion is determined (908). The amount of methane abated may be determined according to any of the approaches described herein. Based on the amount of methane abated, a global warming abatement amount is determined (910). For example, the amount of methane abated by the catalytic combustor device may be compared to global, regional, or national methane emission amounts, and an abatement value may be calculated for the catalytic combustor device.

Figure 10:
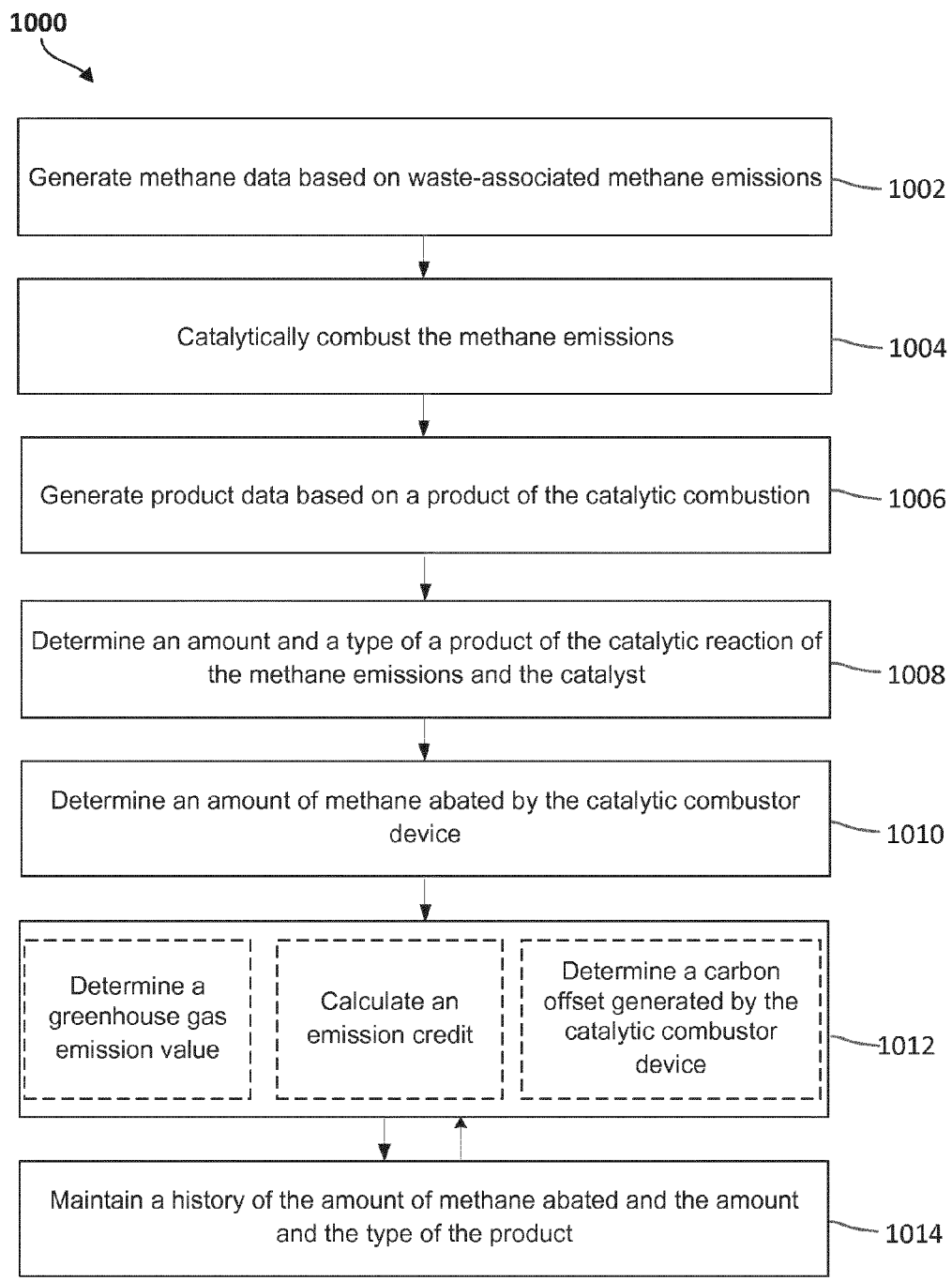
FIG. 10 is a flowchart of a process for abating waste methane according to one embodiment.

Referring to FIG. 10, a flow diagram of a process 1000 for abating waste methane is shown, according to one embodiment. In alternative embodiments, fewer, additional, and/or different actions may be performed. Also, the use of a flow diagram is not meant to be limiting with respect to the order of actions performed. Methane data is generated based on waste-associated methane emissions entering a catalytic combustor device or within the atmosphere around the combustor device (1002). The methane emissions are catalytically combusted by a catalytic combustor device (1004). Product data is generated based on a product of the catalytic combustion (1006). An amount and type of a product of the catalytic combustion is also determined using the product data (1008). An amount of methane abated by combustion is determined (1010). The amount of methane abated may be determined according to any of the approaches described herein. Based on the amount of methane abated, other metrics that are related to the performance of the catalytic combustor device are also calculated (1012). For example, a greenhouse gas emission value may be calculated based on the amount and type of the products of combustion and the amount of methane prior to combustion. As another example, an emission credit may be calculated based on a credit price offered by a governing body. This may be based on national or regional guidelines, or may be based on a local incentive program. As another example, a carbon offset generated by the catalytic combustor device may also be determined. A history of the amount of methane abated and the amount and type of various products of combusting the methane emissions is maintained (1014). The history of data may be used in determining any of the metrics or values related to the catalytic combustor device as described herein. The history may also be reported by the catalytic combustor device.

Figure 11:
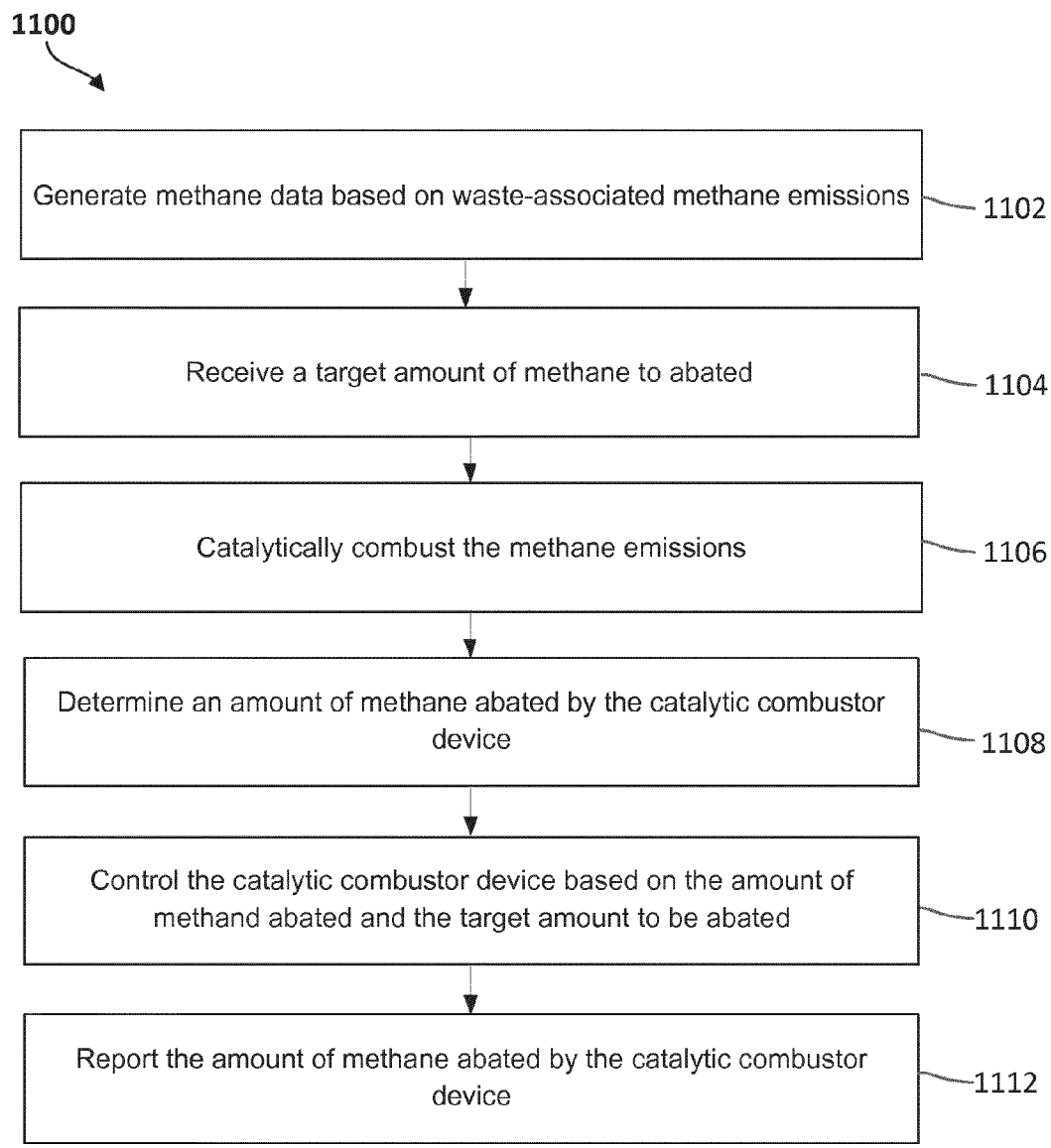
FIG. 11 is a flowchart of a process for abating waste methane according to one embodiment.

Referring to FIG. 11, a flow diagram of a process 1100 for abating waste methane is shown, according to one embodiment. In alternative embodiments, fewer, additional, and/or different actions may be performed. Also, the use of a flow diagram is not meant to be limiting with respect to the order of actions performed. Methane data is generated based on waste-associated methane emissions entering a catalytic combustor device (1102). A target amount of methane to be abated is received by the catalytic combustor device (1104). For example, target values may be sent wirelessly to the device or may be provided to the device as an initial configuration. Alternatively, the catalytic combustor device may include physical controls that allow the device to be configured and a target abatement amount entered. The target values may include specific amounts of methane to be abated per hour, day, week, etc. The target values may also include average amounts of methane to be abated by the device. The methane emissions are catalytically combusted by a catalytic combustor device (1106) and an amount of methane abated by combustion is determined (1108). Based on the amount of methane abated, combustion by the catalytic combustor device may continue until the target abatement amount is reached or an average abatement amount is maintained. The catalytic combustor device may be controlled based on the target or average amounts (1110). The amount of methane abated by the catalytic combustor device is reported (1112).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of abating methane derived from waste in a system including a catalytic combustor device, the method comprising:
    receiving methane emissions by a catalytic combustor device, wherein the methane emissions are derived from waste in a waste container;
    sensing, with a methane sensor of the catalytic combustor device, the methane emissions received by the catalytic combustor device;
    controlling, with a processing circuit of the catalytic combustor device, a heating element of the catalytic combustor device to initiate catalytic combustion of the received methane emissions, wherein the catalytic combustion includes a reaction of the received methane emissions and a catalyst of the catalytic combustor device in the presence of heat;
    generating, with a combustion sensor of the catalytic combustor device, combustion data based on the catalytic combustion of the methane emissions received by the catalytic combustor device, wherein the combustion sensor is configured to sense a parameter of the catalytic combustion, and wherein the combustion data is indicative of an energy released by the catalytic combustion;
    determining, by the processing circuit of the catalytic combustor device, an amount of methane abated by the catalytic combustor device, wherein the amount of methane abated is based on the energy released by the catalytic combustion;
    transmitting, with a transmitter of the catalytic combustor device, the amount of methane abated by the catalytic combustor device to an external device; and
    controlling, with the processing circuit of the catalytic combustor device, the heating element to alter a temperature of the catalyst based on the combustion data and a price of an emission credit related to methane abatement, the price of the emission credit received by the processing circuit, the processing circuit configured to receive the price of the emission credit via a receiver.

2. The method of claim 1, further comprising generating, with a product sensor separate from the combustion sensor, product data based on a product created by the catalytic combustion, wherein the product data is indicative of a presence of at least one of carbon dioxide, water, carbon monoxide, oxygen, or unabated methane, and wherein the unabated methane is present due to incomplete combustion of the methane emissions.

3. The method of claim 1, wherein the combustion sensor comprises an energy sensor configured to generate combustion data based on an energy release of the catalytic combustion.

4. The method of claim 1, wherein the combustion sensor comprises a methane sensor configured to generate methane data based on the methane emissions.

5. The method of claim 4, further comprising determining a relative amount of methane abated by the catalytic combustor device, wherein the relative amount of methane abated is based on the combustion data and the methane data.

6. The method of claim 4, further comprising determining a concentration of methane based on the methane data, and wherein the amount of methane abated is determined based on comparing a concentration of methane prior to catalytic combustion with a concentration of methane after catalytic combustion.

7. The method of claim 1, further comprising determining, by the processing circuit of the catalytic combustor device, a global warming abatement amount indicative of how much the device has contributed to abatement of methane globally, regionally, or nationally, by comparing the amount of methane abated by the catalytic combustor device to at least one of a global, regional, or national methane emission amount.

8. The method of claim 1, further comprising:
    generating with a product sensor separate from the combustion sensor, product data indicative of a product of the catalytic combustion of the methane emissions and the catalyst;
    determining, by the processing circuit of the catalytic combustor device, a presence of the product and an amount and a type of the product based on the product data, wherein the type of the product includes at least one of carbon dioxide, water, carbon monoxide, oxygen, or unabated methane, and wherein the unabated methane is present due to incomplete combustion of the methane emissions; and
    reporting, by the transmitter of the catalytic combustor device, the amount and the type of the product.

9. The method of claim 8, further comprising determining, by the processing circuit of the catalytic combustor device, a greenhouse gas emission value based on the amount and the type of the product, and at least one of a governmental guideline or an incentive program.

10. The method of claim 8, further comprising calculating, by the processing circuit of the catalytic combustor device, an emission credit based on the amount of methane abated and the amount and the type of the product, and at least one of a governmental guideline or an incentive program.

11. The method of claim 8, further comprising determining, by the processing circuit of the catalytic combustor device, a carbon offset generated by the catalytic combustor device, wherein the carbon offset is based on the amount of methane abated or the amount and the type of the product.

12. A non-transitory computer-readable medium having instructions stored thereon, that when executed by a computing device cause the computing device to perform operations for abating methane derived from waste, the operations comprising:
    controlling operation of a catalytic combustor device to:
        receive, by the catalytic combustor device, methane emissions derived from waste in a waste container; and
        control a heating element of the catalytic combustor device to initiate catalytic combustion of the received methane emissions, wherein the catalytic combustion includes a reaction of the received methane emissions and a catalyst of the catalytic combustor device in the presence of heat;

receiving, from a combustion sensor configured to sense parameters of the catalytic combustion, combustion data based on the catalytic combustion of the methane emissions received by the catalytic combustor device, wherein the combustion data is indicative of an energy released by the catalytic combustion;

determining an amount of methane abated by the catalytic combustor device, wherein the amount of methane abated is based on the energy released by the catalytic combustion;

transmitting, with a transmitter of the catalytic combustor device, the amount of methane abated by the catalytic combustor device to an external device; and controlling, with a processing circuit of the catalytic combustor device, the heating element to alter a temperature of the catalyst based on the combustion data and a price of an emission credit related to methane abatement, the price of the emission credit received by the processing circuit, the processing circuit configured to receive the price of the emission credit via a receiver.

13. The non-transitory computer-readable medium of claim 12, wherein the instructions further cause the computing device to generate product data using a product sensor separate from the combustion sensor, the product data indicative of an amount of a product of the catalytic combustion, and wherein the product includes at least one of carbon dioxide, water, carbon monoxide, oxygen, or unabated methane, and wherein the unabated methane is present due to incomplete combustion of the methane emissions.

14. The non-transitory computer-readable medium of claim 12, wherein the operations further comprise determining a global warming abatement amount by comparing the amount of methane abated by the catalytic combustor device to at least one of a global, regional, or national methane emission amount.

15. The non-transitory computer-readable medium of claim 12, wherein the operations further comprise:

generating with a product sensor separate from the combustion sensor, product data indicative of a product of the catalytic combustion of the methane emissions and the catalyst;

determining a presence of the product and an amount and a type of the product based on the product data, wherein the type of the product includes at least one of carbon dioxide, water, carbon monoxide, oxygen, or unabated methane, and wherein the unabated methane is present due to incomplete combustion of the methane emissions; and reporting, with a transmitter of the catalytic combustor device, the amount and the type of the product.

16. The non-transitory computer-readable medium of claim 15, wherein the operations further comprise determining a greenhouse gas emission value based on the amount and the type of the product, and at least one of a governmental guideline or an incentive program.

17. The non-transitory computer-readable medium of claim 15, wherein the operations further comprise determining a carbon offset generated by the catalytic combustor device, wherein the carbon offset is based on the amount of methane abated and the amount and the type of the product.

* * * * *